United States Patent [19]

Schäfer

[11] Patent Number: 5,295,446
[45] Date of Patent: Mar. 22, 1994

[54] VARIABLE SHELF ASSEMBLY

[75] Inventor: Gerhard Schäfer, Neunkirchen, Fed. Rep. of Germany

[73] Assignee: Fritz Schäfer Gesellschaft, Mit beschränkter Haftung, Fed. Rep. of Germany

[21] Appl. No.: 797,460

[22] Filed: Nov. 22, 1991

[30] Foreign Application Priority Data

Nov. 22, 1990 [DE] Fed. Rep. of Germany ....... 9015885

[51] Int. Cl.$^5$ .............................................. A47B 47/00
[52] U.S. Cl. .................................... 108/167; 211/187
[58] Field of Search ......... 108/111, 109, 110; 248/250, 243; 211/59.2, 191, 187

[56] References Cited

U.S. PATENT DOCUMENTS

| | | | |
|---|---|---|---|
| 3,111,915 | 11/1963 | Gray | 211/59.2 |
| 3,363,867 | 1/1968 | Zackrisson | 248/250 |
| 4,064,996 | 12/1977 | Shillum | 211/191 |
| 4,142,637 | 3/1979 | Kraiss | 211/191 |
| 4,239,099 | 12/1980 | Williams et al. | 211/59.2 |
| 4,359,947 | 11/1982 | Marschak | 108/111 |
| 4,506,790 | 3/1985 | Muscari | 108/111 |
| 4,648,517 | 3/1987 | Schäfer | 108/111 |
| 5,115,920 | 5/1992 | Tipton et al. | 108/111 |

FOREIGN PATENT DOCUMENTS

| | | | |
|---|---|---|---|
| 1201345 | 12/1959 | France | 108/107 |
| 1463180 | 11/1966 | France | 211/148 |
| 616274 | of 1961 | Italy | 211/187 |

Primary Examiner—James R. Brittain
Assistant Examiner—Janet M. Long
Attorney, Agent, or Firm—Anderson Kill Olick & Oshinsky

[57] ABSTRACT

A variable shelf assembly includes side frames composed of posts, transverse support members and diagonal struts, and longitudinal support members and/or longitudinal stop members which connect the posts of two side frames releasably but rigidly with each other, and shelf members mounted between two side frames. The shelf members can be placed between two frames which are coupled to each other by means of several longitudinal support members and/or longitudinal stop members either in horizontal alignment or in a unilaterally inclined alignment in the transverse direction. At least at the removal side of the shelf assembly, each shelf member is provided with a longitudinal support member and/or a longitudinal stop member forming a support and abutment element. A basic shelf element is formed by two frames with corresponding longitudinal support members and/or longitudinal stop members and the shelf members.

15 Claims, 15 Drawing Sheets

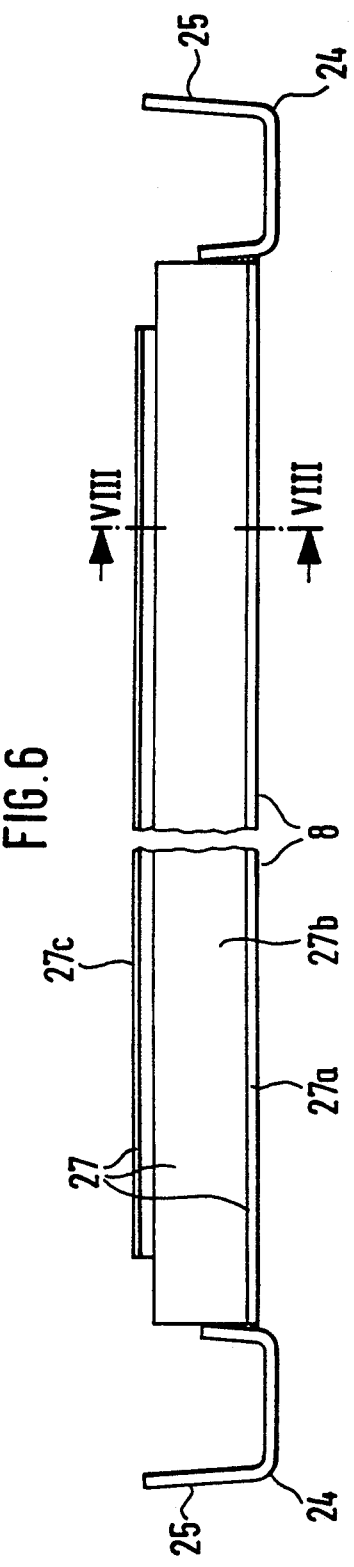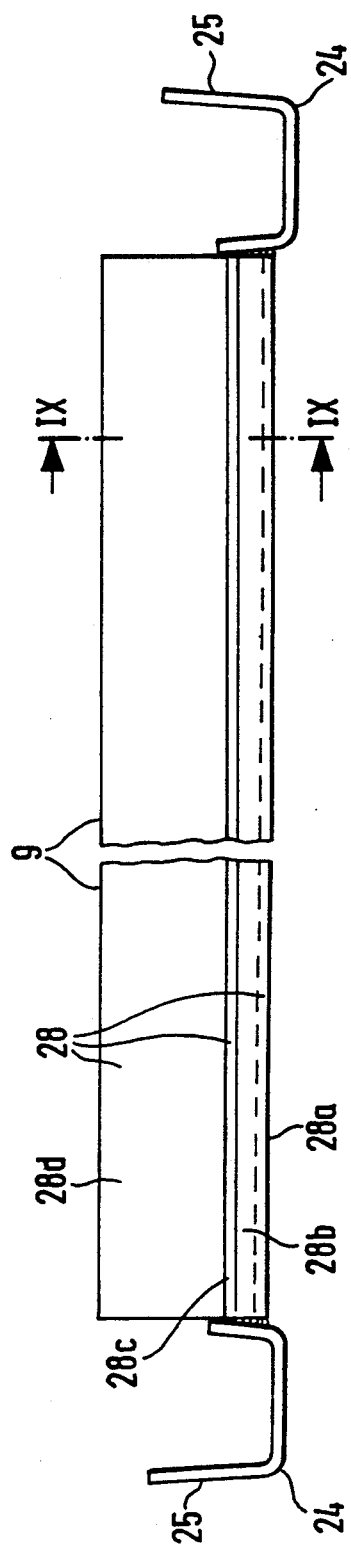

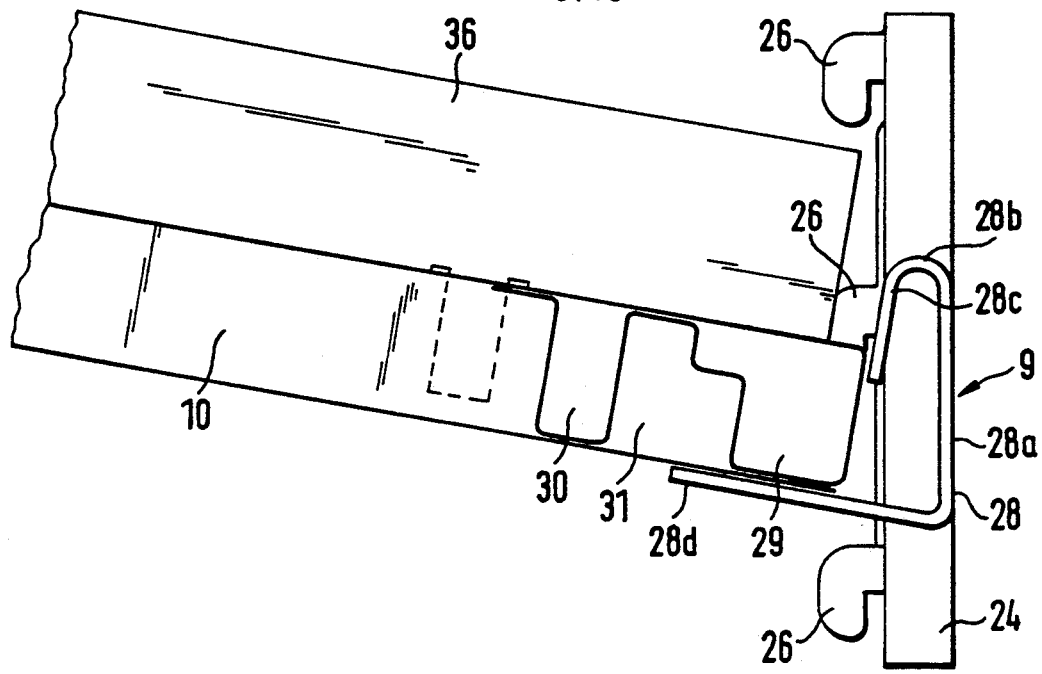
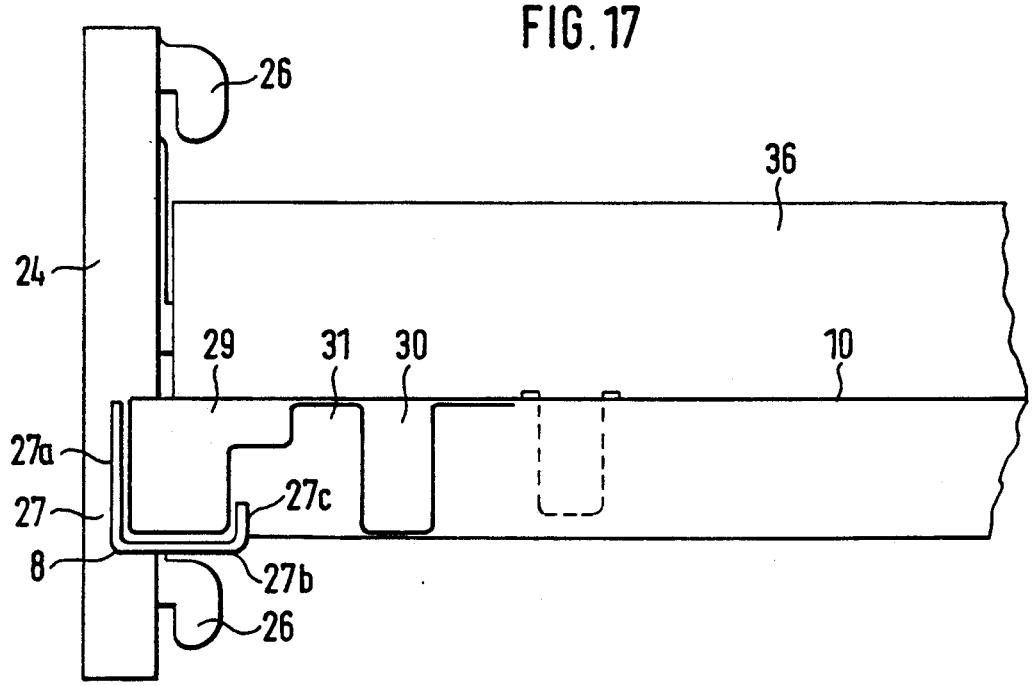

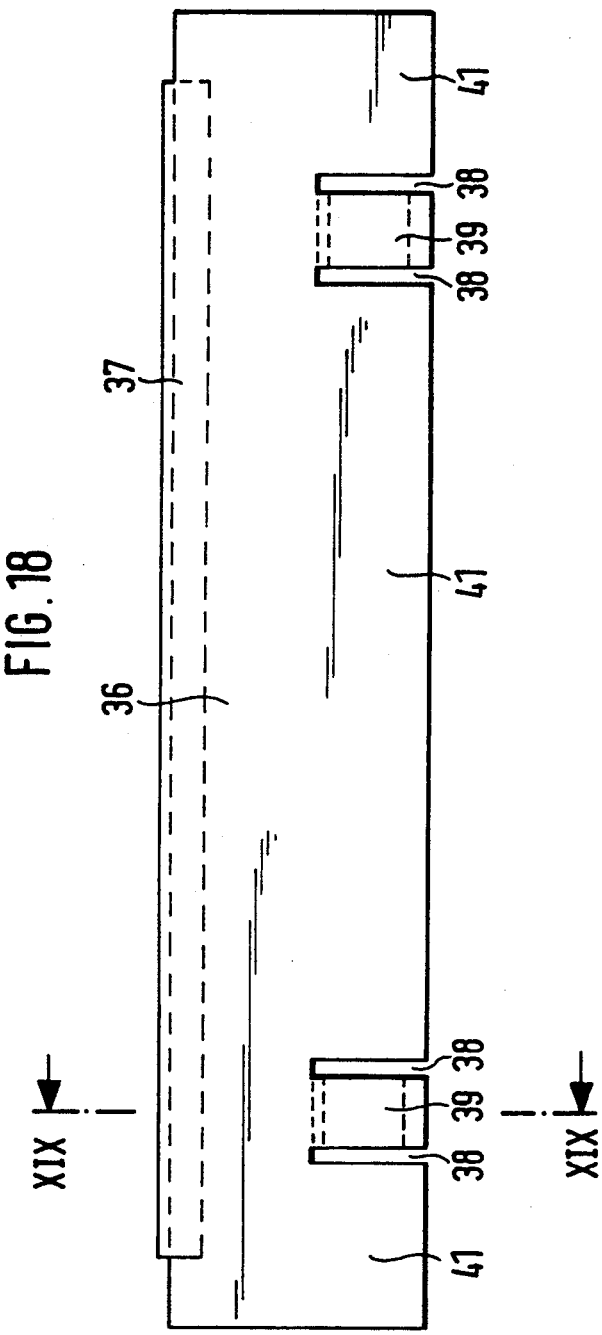
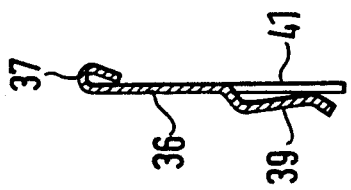

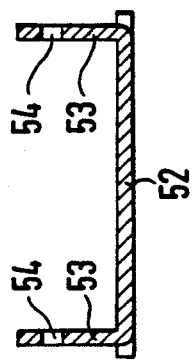
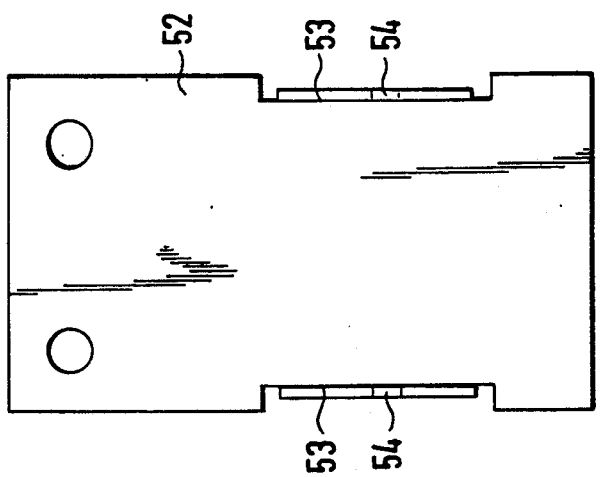
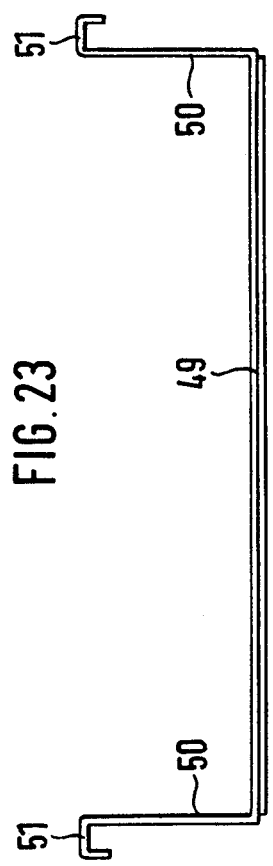
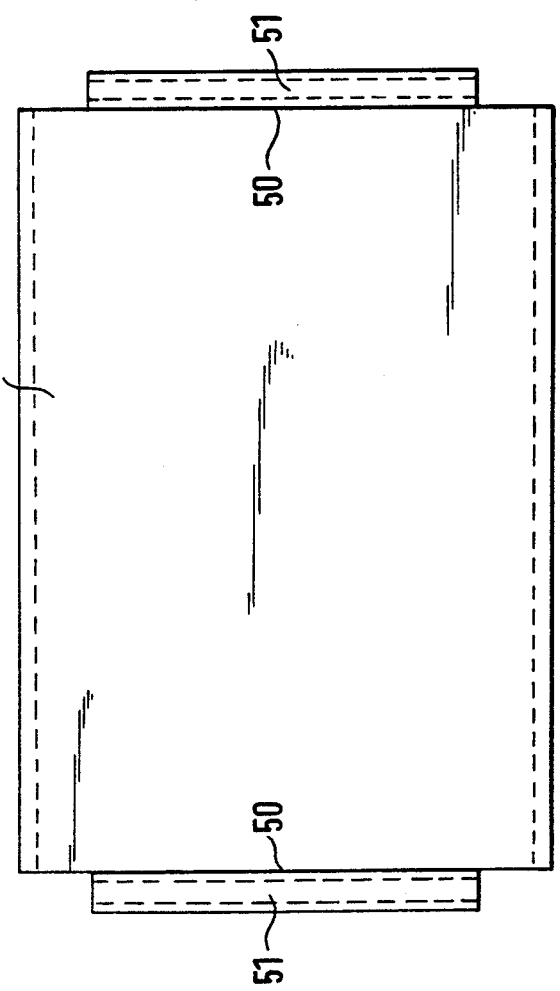

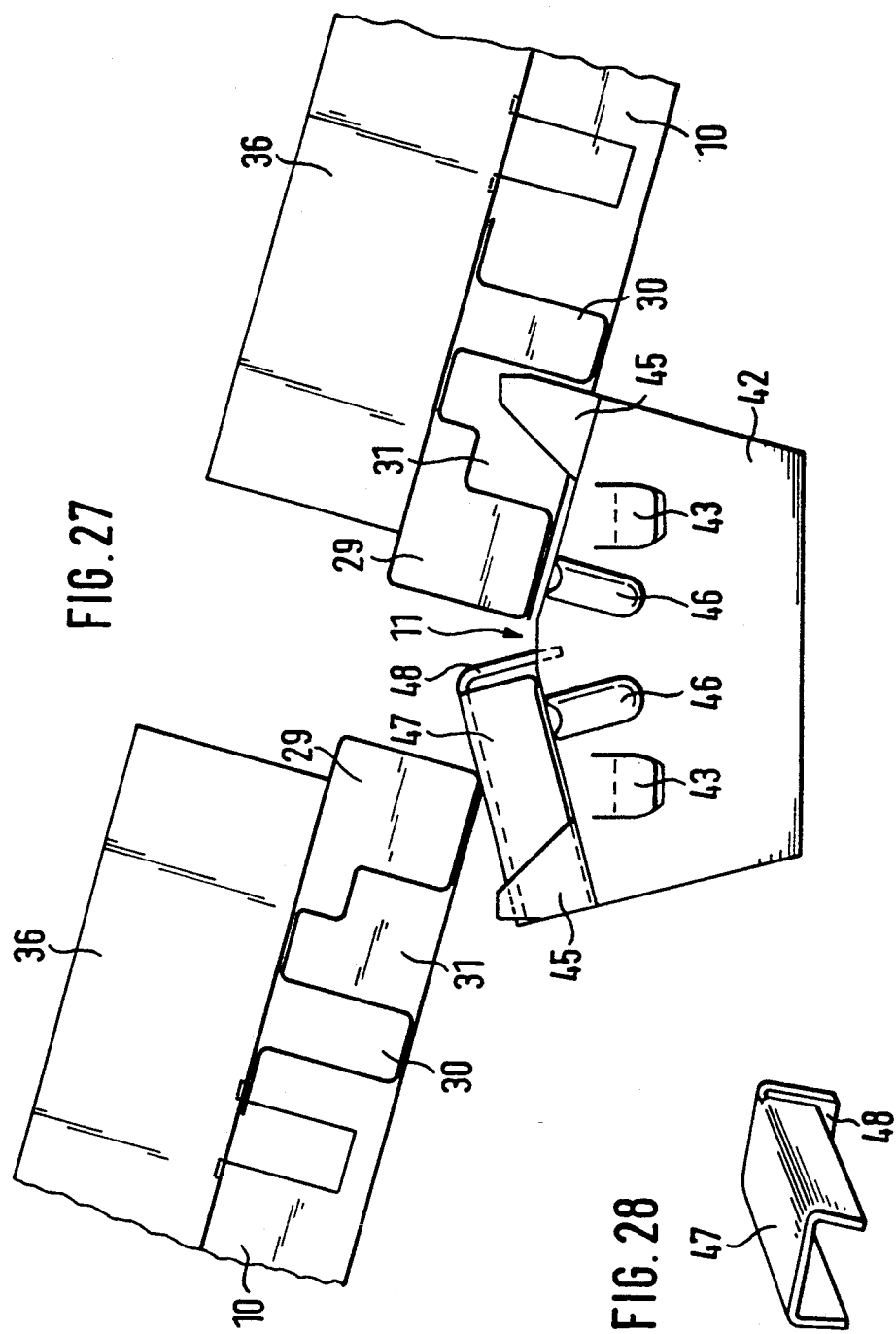

VARIABLE SHELF ASSEMBLY

BACKGROUND OF THE INVENTION

The present invention relates to a variable shelf assembly including side frames composed of posts, transverse support members and diagonal struts, and longitudinal support members and/or longitudinal stop members which connect the posts of two side frames releasably but rigidly with each other, and shelf members, wherein each shelf member can be placed between two side frames which are connected to each other by the longitudinal support members and/or longitudinal stop members.

SUMMARY OF THE INVENTION

In accordance with the present invention, the shelf members can be placed between two frames which are coupled to each other by means of several longitudinal support members and/or longitudinal stop members selectively either in a horizontal alignment or in a unilaterally inclined alignment in the transverse direction thereof. At least at the removal side of the shelf assembly, each shelf member is provided with a longitudinal support member and/or longitudinal stop member as a support and abutment element. A basic shelf element is formed by two frames with the corresponding longitudinal support members and/or longitudinal stop members as well as the shelf members.

When two basic shelf elements of the above-described type are arranged one behind the other, the shelf elements are coupled to each other by means of shelf member carriers which simultaneously can engage in the immediately adjacent posts of the respective frames.

When two basic shelf elements are arranged one behind the other in the above-described manner, several arrangements are possible. For example, it is possible in accordance with the present invention to arrange all shelf members of basic shelf elements to be aligned horizontally, wherein always two shelf members are located one behind the other in the same plane, so that the longitudinal edges of two adjacent shelf members which face each other exclusively rest with the end portions thereof on the shelf member carriers. This results in a storage shelf assembly having a relatively great structural depth.

However, it is also possible to arrange all shelf members of one basic shelf element in horizontal alignment, while all shelf members of the second basic shelf element assume an inclined position, wherein the longitudinal edge of each inclined shelf member is located in the same plane with the longitudinal edge of the adjacent horizontally aligned shelf member and wherein the longitudinal edges of the two adjacent shelf members which face each other rest exclusively with the end portions thereof on the shelf member carriers. This results in a combined storage and so-called disposition shelf assembly.

In accordance with another development of the invention, a so-called disposition shelf assembly having a great structural depth can be obtained if all shelf members of both basic shelf elements are mounted with an inclined position and always two shelf members are located on the same inclined plane and the longitudinal edges of the two adjacent shelf members rest exclusively with the end portions thereof on the shelf member carriers, wherein each shelf member carrier includes a lining adapter in the region of the lower longitudinal edge of the shelf member which is located higher. As a result, it is ensured that both shelf members located one behind the other are supported in the region of the shelf member carrier permanently and securely on the same plane.

In accordance with a particularly important feature of the present invention, the posts of the side frames are hollow sections which are approximately W-shaped in cross-section. The two outer sides of the W-shaped hollow sections and the apex portion between the two inner sides of the W-shaped hollow sections each have at least one row of suspension detents which are arranged uniformly distributed in longitudinal direction. The ends of the transverse support members extend into the open side of the hollow section and are anchored or can be anchored on the outer sides of the hollow section. The suspension detents form in the apex portion of the inner sides of the W-shaped hollow section of each post coupling means for coupling shoes provided at the ends of the longitudinal support members and/or longitudinal stop members. The coupling shoes extend around and are adapted to an outer side of the hollow section and an inner side of the hollow section of the posts, while they can be engaged by means of coupling hooks in the coupling means. The suspension detents are provided at the outer sides of the W-shaped hollow section of the post as coupling means for locking tongues on the shelf member carriers and/or on post connectors.

The features described above not only make it possible that longitudinal support members and/or longitudinal stop members, shelf members and shelf member carriers can be mounted horizontally between the side frames in various vertical positions. Moreover, it is also possible to mount the shelf members in an inclined position in transverse direction in such a way that the angle of inclination of the shelf members can be adjusted within certain limits, wherein the different angles of inclination are determined by the spacing between the coupling means of the posts.

In accordance with another important feature of the invention, the free ends of the two outer sides of the W-shaped hollow sections of the posts are each provided with an inwardly bent angle portion, wherein the end flanges of both angle portions are located on a plane which extends approximately in the middle between an outer and an inner side of the W-shaped hollow section. The space between an outer side and an inner side of the W-shaped hollow section as well as the space between the two inner sides of the W-shaped hollow section are approximately trapezoidally shaped and the end flanges of both angle portions are provided with fastening means, for example, holes, for the transverse support members and/or the diagonal struts of the side frames.

The above-described structural configuration of the posts which form a significant part of the side frames not only results in a high stability of the side frames but also ensures that all connecting components can be engaged in the corresponding locking recesses of the posts without impairment even at those locations where a connection exists between the post and the transverse support members and/or diagonal struts.

In accordance with a further development of the invention, simultaneously engageable in the suspension detents provided in the apex portion of the inner sides of the W-shaped hollow section of each post are the coupling hooks of the coupling shoes of two longitudinal support members and/or longitudinal stop members which are directed toward opposite sides, wherein the second group of longitudinal support members and/or longitudinal stop members form, together with another side frame, a basic shelf element by means of which, if required, the structural length of a basic shelf element can be increased.

In accordance with another feature, the longitudinal support members and/or longitudinal stop members are composed of sectional rails which are mounted rigidly between two coupling shoes which are arranged and constructed in a mirror-inverted manner. The sectional rails have an approximately L-shaped cross-section or approximately the cross-section of an upside down J.

In accordance with another feature, the undersides of the shelf members have at the longitudinal and transverse edges stiffening profiles formed by bevels. The stiffening profiles are composed of several profile portions which are closed in the manner of a pipe and extend parallel to each other and at a distance from each other, wherein the spaced-apart portions have a stepped configuration, wherein the stepped portion forms a support engagement for the sectional rails of the longitudinal support members and/or longitudinal stop members and for fixing teeth or fixing tongues provided on the shelf member carrier. The resulting construction provides the possibility of a partial integration of the longitudinal support members and/or longitudinal stop members in the shelf members and increases the longitudinal stability of the shelf members.

In accordance with a further development of the present invention, the shelf member carriers can be provided at the top at a coupling plate supporting the locking tongues with two support flanges for the shelf members, wherein the support flanges are angled and inclined in a roof-like manner relative to each other. The fixing teeth or fixing tongues, in turn, extend upwardly from the end edges of the support flanges. Stabilizing webs extend between the coupling plate and the support flanges.

The lining adapters mentioned previously can preferably be anchored and/or aligned by means of fixing tongues on the support flanges of the shelf member carrier.

In accordance with another feature, it is also possible to releasably connect wall members to the transverse edges of the shelf members if it is to be prevented that items placed on the shelf members are displaced laterally to the region of the posts. It has been found useful if the wall members rest over the lower portion of the height thereof against the outer sides of the stiffening profiles of the transverse edges of the shelf member, on the one hand, while, on the other hand, they engage with tongues bent out of the plane thereof from the top into slots which are provided near the edges in the upper side of the shelf member.

In accordance with an advantageous feature, at least the longitudinal support members and/or longitudinal stop members on the removal side of the shelf assembly are composed of sectional rails which have a structural height which exceeds the structural height of the shelf members. As a result, the items resting on the shelf members are prevented from being displaced easily toward the removal side over the edge of the shelf member. On the contrary, these items can only be removed from the respective shelf member and out of the removal side when these items are previously raised above the raised sectional rail.

The various features of novelty which characterize the invention are pointed out with particularity in the claims annexed to and forming a part of this disclosure. For a better understanding of the invention, its operating advantages attained by its use, reference should be had to the drawing and descriptive matter in which there are illustrated and described preferred embodiments of the invention.

BRIEF DESCRIPTION OF THE DRAWING

In the drawing:

FIG. 6 is a top view, on a large scale, of a longitudinal support member of the shelf assembly of FIG. 1;

FIG. 7 is a top view, on a larger scale, of a longitudinal stop member of the shelf assembly of FIG. 1;

FIG. 16 is a sectional view, on a larger scale, of detail XVI of FIG. 2;

FIG. 17 is a sectional view, on a larger scale, of detail XVII of FIG. 2;

FIG. 18 is a side view, on a larger scale, of detail XVIII of FIG. 1;

FIG. 19 is a sectional view taken along sectional line XIX—XIX of FIG. 18;

FIG. 23 is a view, on a larger scale, of detail XXIII in FIG. 1;

FIG. 24 is a top view of the detail of FIG. 23;

FIG. 25 is a vertical sectional view, on a larger scale, of detail XXV of FIG. 1;

FIG. 26 is a top view of the detail of FIG. 25;

FIG. 27 is a different embodiment of the detail shown in FIG. 22 with an additional component; and FIG. 28 is perspective view of the additional component of FIG. 27.

DESCRIPTION OF THE PREFERRED EMBODIMENTS

Figure 1:
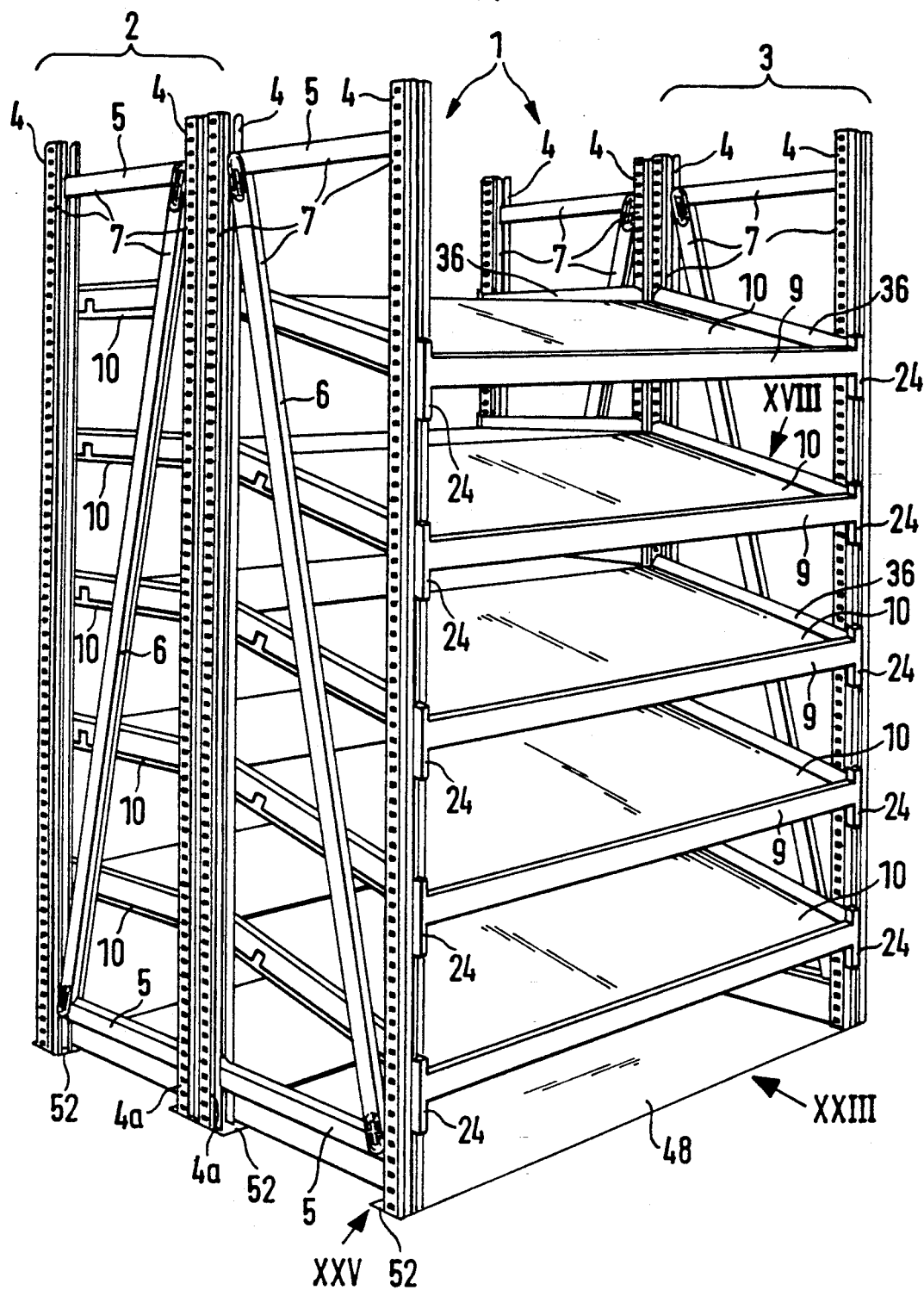
FIG. 1 is a schematic perspective view of a shelf assembly according to the present invention, composed of a rear and a front basic shelf element, wherein the shelf members in the rear basic shelf element and in the front basic shelf element have different mounting positions.
Figure 2:
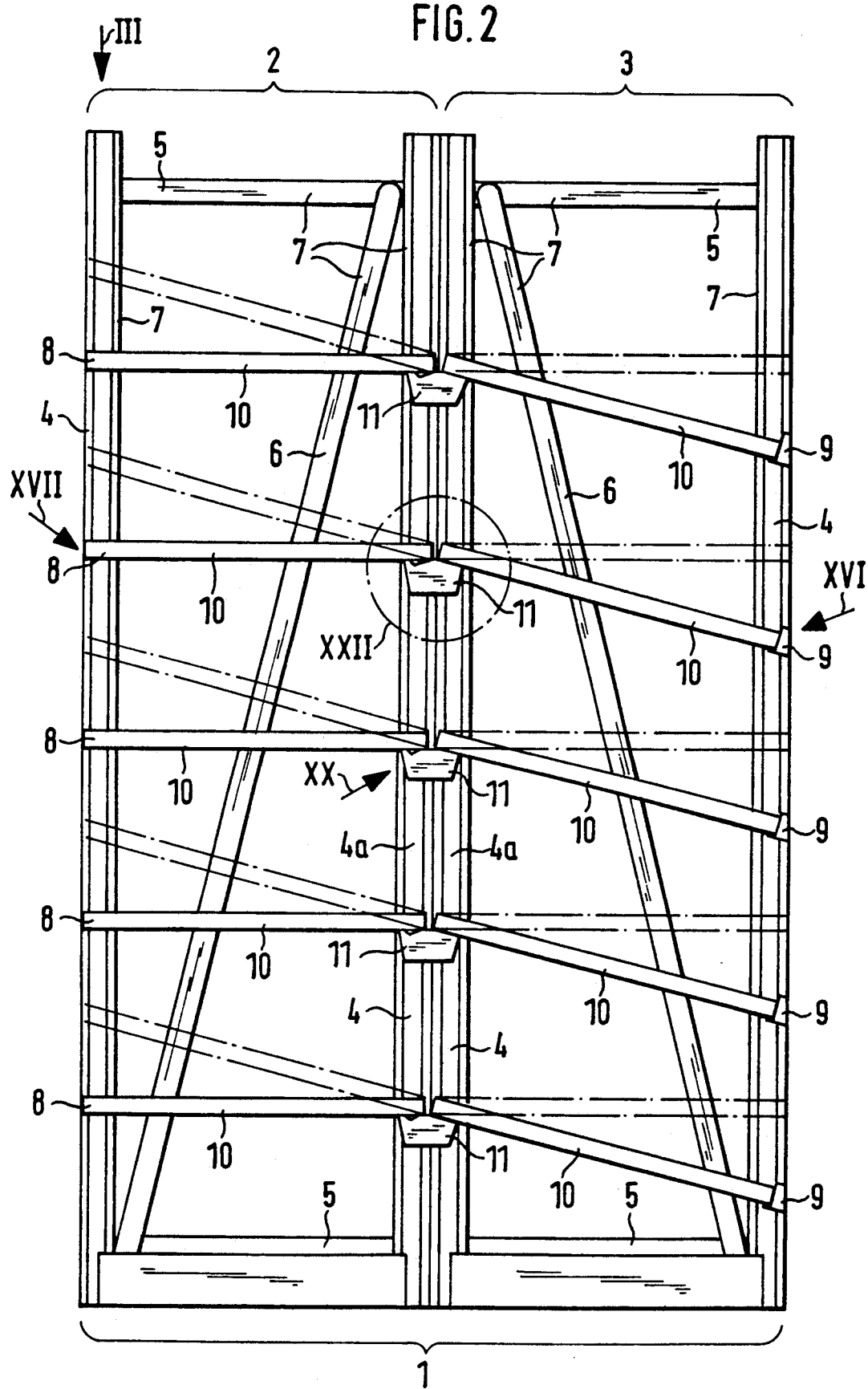
FIG. 2 is a side view of the shelf assembly of FIG. 1, wherein the position of the shelf members of the two basic shelf elements arranged one behind the other which correspond to that of FIG. 1 are shown in solid lines, while two different possibilities of arranging the shelf members are indicated by broken or dash-dot lines, respectively.

FIG. 1 of the drawing is a perspective view and FIG. 2 of the drawing is a side view of a shelf assembly 1 which includes a basic shelf element 2 in the rear and a basic shelf element 3 in the front.

Each of the basic shelf elements 2 and 3 can be mounted and used individually, so that, instead of the shelf assembly 1 arranged in two rows as shown in FIGS. 1 and 2, a single-row shelf assembly is formed.

Each basic shelf element 2 and 3 has four posts 4 which are all constructed in the same manner. Always two posts are connected to each other through two transverse support members 5 and a diagonal strut 6 to form a rigid frame 7.

Always two frames 7 form a basic shelf element 2 or 3 together with several longitudinal support members 8 or longitudinal stop members 9 and with shelf members 10.

When the basic shelf elements 2 and 3 are mounted individually, it is necessary to provide longitudinal support members 8 and/or longitudinal stop members 9 adjacent the two longitudinal edges of the shelf members 10 between the corresponding frames 7.

On the other hand, if the two basic shelf elements 2 and 3 are mounted directly one behind the other, as illustrated with respect to the shelf assembly 1 in FIGS. 1 and 2 of the drawing, two posts 4a of the frames 7 of both basic shelf elements 2 and 3 are placed closely next to each other, as can be seen in FIGS. 1 and 2. In this case, no longitudinal support members 8 or longitudinal stop members 9 are mounted between the posts 4a which belong to the same basic shelf element 2 and 3. Instead, a direct coupling is effected between the two adjacent posts 4a by means of special shelf member carriers 11, as they can be seen in FIG. 2 of the drawing.

In the shelf assembly 1 shown in FIGS. 1 and 2 of the drawing, the shelf members 10 of the basic shelf element 2 are arranged so as to be aligned horizontally. In the basic shelf element 3, on the other hand, the shelf members 10 are mounted in an inclined position. The shelf members 10 are arranged in such a way that the longitudinal edge of the inclined shelf member 10 facing the center of the shelf assembly 1 is located higher than the longitudinal edge facing the removal side of the shelf assembly 1 on the righthand side in FIG. 2.

The longitudinal edges of the shelf members 10 of both basic shelf elements 2 and 3 which face each other rest with the ends thereof on a common shelf member carrier 11 in such a way that the longitudinal edge of the inclined shelf member 10 which is located highest is approximately on the same level as the corresponding horizontally aligned shelf member 10.

As a result of the mounting positions of the shelf members described above, the shelf assembly 1 illustrated in FIGS. 1 and 2 of the drawing, is a combined storage and so-called disposition shelf assembly.

However, as illustrated by dash-dot lines, on the one hand, and broken lines, on the other hand, in FIG. 2 of the drawing, the adjacent shelf members 10 of both basic shelf elements 2 and 3 can be mounted either with inclined positions as shown in dash-dot lines or in horizontal position as shown in broken line. In the first case, the shelf assembly is a so-called disposition shelf assembly with twice the structural depth and in the second case, it is a storage shelf assembly with twice the structural depth.

For a variable shelf assembly 1 of any possible configuration, it is very important that the shelf members 10 and, consequently, the longitudinal support members 8, the longitudinal stop members 9 and the shelf members 10 can be mounted between the frame 7 so as to be finely adjustable in vertical direction. For this reason, it is necessary that each post 4 of the frame 7 has a special configuration as it is illustrated in FIGS. 3 to 5 of the drawing.

Figure 3:
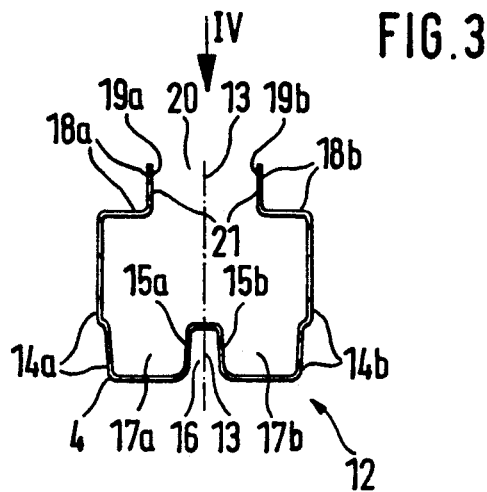
FIG. 3 is a front view, on a larger scale, of a post of a side frame of the shelf assembly seen in the direction of arrow III of FIG. 2.
Figure 4:
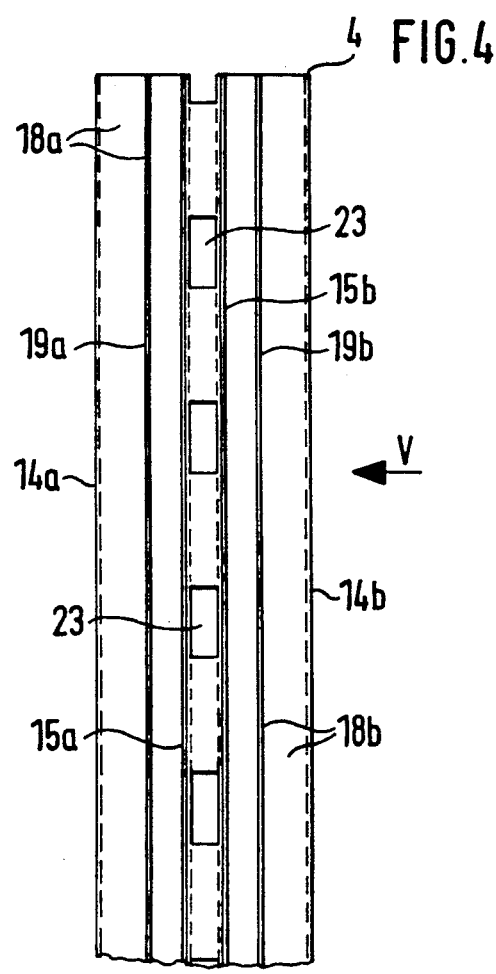
FIG. 4 is a view seen in the direction of arrow IV of FIG. 3.

As illustrated in FIG. 3 of the drawing, the posts 4 of the frame 7 are hollow sections 12, for example, of sheet metal, with W-shaped cross-sections. These sheet metal sections 12 are constructed so as to be symmetrical with respect to a center plane 13—13 and, consequently, have two outer W-section sides 14a and 14b and two inner W-section sides 15a and 15b. The two outer W-section sides 14a and 14b have a substantially greater width than the two inner W-section sides 15a and 15b, as can be easily seen in FIG. 3.

The space 16 located between and extending over the width of the two inner W-section sides 15a and 15b is defined by an outwardly open roof or channel which is trapezoidally-shaped in cross-section. In addition, the spaces 17a and 17b which are each located between an outer W-section side 14a or 14b and an inner W-section side 15a and 15b, are also trapezoidally-shaped. This is because, at this location, the W-section sides 14a and 14b have an oppositely directed inclined position relative to the W-section sides 15a and 15b. However, over a greater width portion, the outer W-section sides 14a and 14b are aligned so as to extend parallel to each other and, moreover, are provided at the free ends thereof with an inwardly bent angle portion 18a and 18b. The end flanges 19a and 19b of these angle portions 18a and 18b are each located on a plane which extends approximately in the middle between an outer W-section side 14a or 14b and an inner W-section side 15a or 15b. The ends of the transverse support members 5 extend into the open section side 20 of the hollow section 12 formed between the two end flanges 19a and 19b. At the end flanges 19a and 19b, the ends of the transverse support members 5 can be connected to the posts 4 to form the frame 7 by means of screws or rivets which are inserted, for example, in holes 21.

Figure 5:
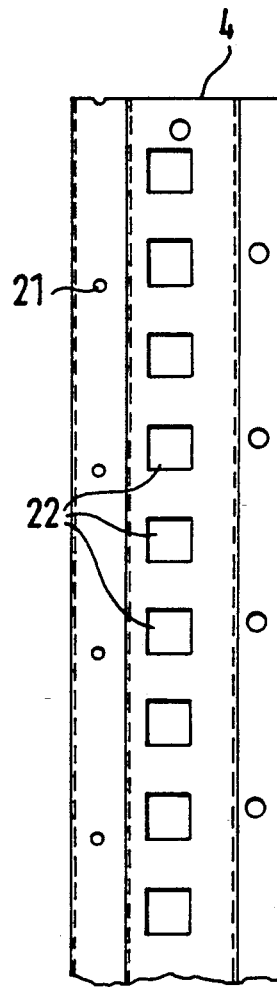
FIG. 5 is a view seen in the direction of arrow V of FIG. 4.

In the two outer W-section sides 14a and 14b, the hollow sections 12 are each provided with suspension detents 22, for example, in the form of square breakthroughs, which are arranged uniformly distributed in longitudinal direction, as can be seen in FIG. 5 of the drawing. On the other hand, the hollow sections 12 have in the apex portion between the two inner W-section sides 15a and 15b additional suspension detents 23 which are formed, for example, by rectangular slots, as can be seen in FIG. 4 of the drawing. The suspension detents 23 are also arranged with uniform spacing in longitudinal direction of the hollow sections 12. However, the spacings between the detents 23 differ from the spacings between the detents 22, as can be seen from a comparison of FIGS. 4 and 5.

While the suspension detents 22 in the outer W-section sides 14a and 14b of the hollow section 12 are provided for suspending the shelf member carrier 11, the suspension detents 23 in the apex portion between the two inner W-section sides 15a and 15b of the hollow section 12 are engaged by coupling shoes 24 which are provided at the ends of the longitudinal support members 8 or the longitudinal stop members 9, as can be seen in FIGS. 1 and 6–10 of the drawing. The coupling shoes 24 have a trapezoidal shape in cross-section which is adapted to the walls forming the cross-sectional shape of the spaces 17a and 17b of the hollow section 12 and, consequently, the coupling shoes 24 can engage these walls with a tight fit. The free end flanges 25 of each coupling shoe 24 carries several, for example, three coupling hooks 26 which engage the suspension detents 23 of the hollow sections 12 or the posts 4 and, as a result, the longitudinal support members 8 or longitudinal stop members 9 are securely resting against the posts 4.

The width of the space 16 between the two inner W-section sides 15a and 15b of the hollow section 12 or of the posts 4 and the width of the suspension detents 23 in the apex portion between the two inner W-section sides 15a and 15b are selected in such a way that two end flanges 25 with coupling hooks 26 can be received by coupling shoes 24. This makes it possible to suspend on the hollow section 12 or posts 4 immediately next to each other the coupling shoes 24 of two oppositely oriented longitudinal support members 8 or longitudinal stop members 9. Accordingly, it is possible without problems to connect another basic shelf element composed of the appropriate numbers of longitudinal support members 8, longitudinal stop members 9, shelf members 10 and shelf member carriers 11 as well as an additional frame 7 to each of the basic shelf elements 2 and 3. As a result, the length of the shelf assembly can be adapted without problems to the given requirements by using the appropriate number of basic shelf elements.

FIGS. 6 and 7 of the drawing show a longitudinal support member 8 which is formed by a sectional rail 27 which has an approximately J-shaped cross-section. The sectional rail 27 has a rear section side 27a which extends vertically, a section web 27b which is connected to the section side 27a and is inclined obliquely downwardly and a short section side 27c which is connected at an obtuse angle to the section web 27b.

The above-described J-shaped longitudinal support member is used when a basic shelf element 3 with inclined shelf members 10 is to be mounted by itself, i.e., not in an assembly of basic shelf elements 2 and 3 arranged one behind the other.

Figure 9:
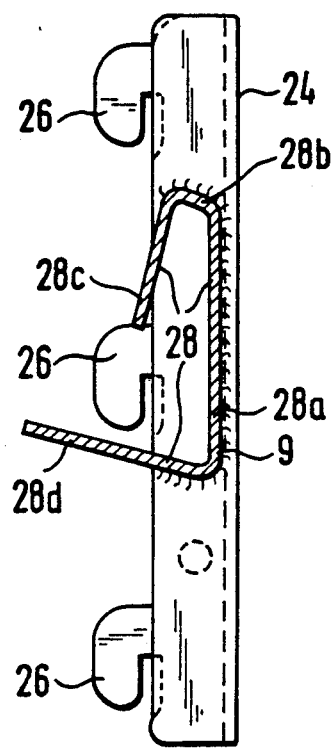
FIG. 9 is a sectional view taken along sectional line IX—IX in FIG. 7.
Figure 10:
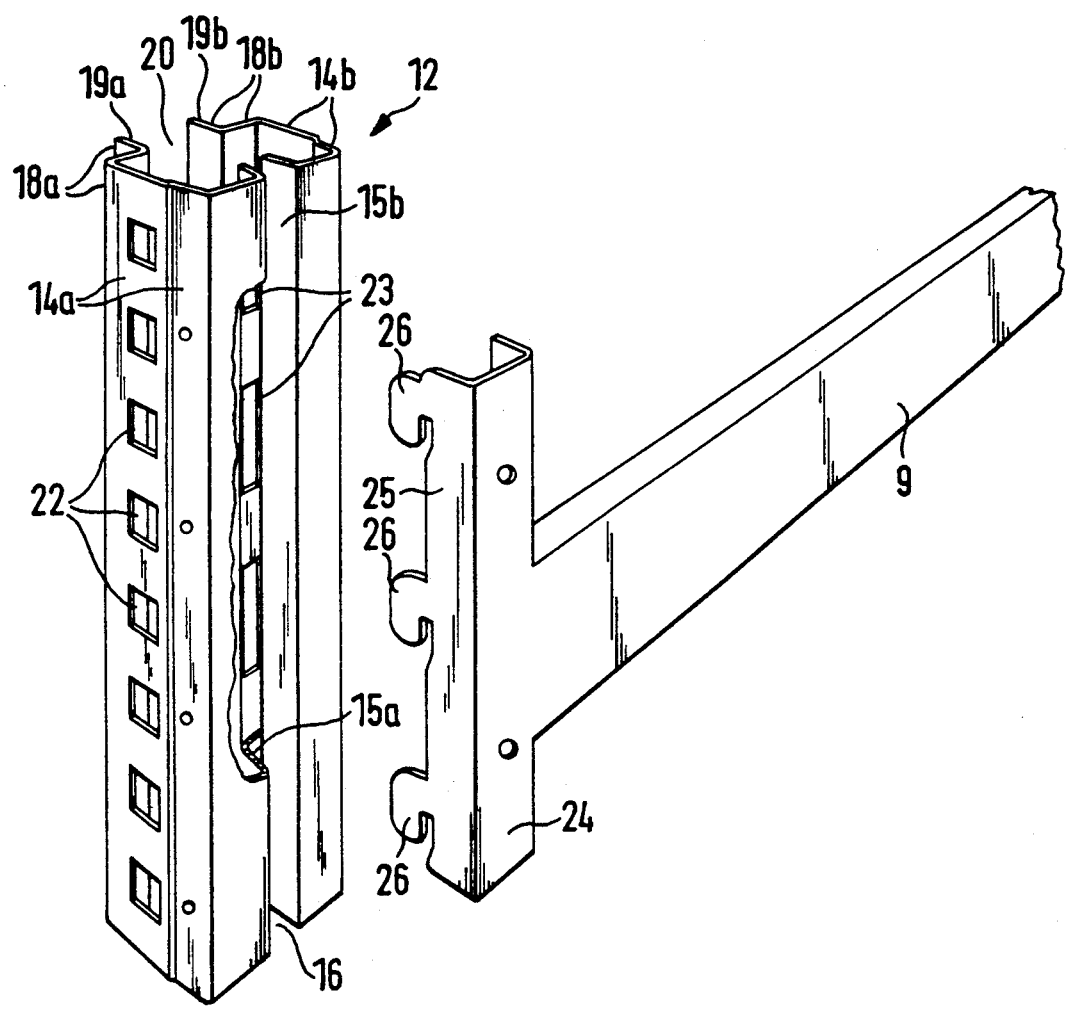
FIG. 10 is an exploded perspective view of a portion of the shelf post belonging to a side frame and a portion of a longitudinal support member or longitudinal stop member with coupling shoe to be engaged in the posts.

The longitudinal stop member 9 illustrated in FIGS. 7 and 9 is a sectional rail 28 which has approximately the cross-sectional shape of a J which is arranged upside down. The sectional rail 28 includes an approximately vertical section web 28a, a section web 28b which is connected at an obtuse angle and upwardly inclined from the section web 28a, and two section sides 28c and 28d which are arranged to extend essentially at a right angle relative to each other. The section side 28c extends approximately at a right angle from the section web 28b, while the section side 28b extends at an acute angle, i.e., an angle of less than 90°, from the section web 28a.

The longitudinal stop members 9 of the type of a sectional rail 28 shown in FIG. 9 are used on the removal side of shelf assembly 1 which include basic shelf elements 3 or added shelf elements whose shelf members 10 have an inclined position in transverse direction, as this can be seen in FIGS. 1 and 2 and in FIG. 16 which is to be described below. The shelf member 10 rests with its underside on the section side 28d and is supported on its longitudinal end face by the lower end portion of the section side 28c, while the section side 28c and the section web 28d project beyond the upper side of the shelf member 10 by a certain dimension and, thus, form a stop for the items or material being stored on the shelf member 10.

FIGS. 11–15 of the drawing show the configuration of the shelf members 10 which are used in the shelf assembly 1 or the basic shelf elements 2 and 3 as well as in any added basic shelf element. As is clear from the drawing, the shelf members 10 are formed by bending the longitudinal and transverse edges of sheet metal blanks.

In order to obtain a high stability of the shelf members 10, along the two longitudinal edges thereof are provided closed pipe-like sections 29 and 30 which are formed by bending over the longitudinal edges. The outer pipe-like section 29 defines an angle-shaped stepped cross-section, while the inner pipe-like section 30 includes a rectangular cross-section. A stepped groove 39 is present between the two pipe-like sections 29 and 30.

It has been found that the pipe-like sections 29 and 30 result together with the groove 39 in a stabilizing effect which not only substantially increases the resistance to distortion of the shelf members but also the resistance to bending.

Figure 13:
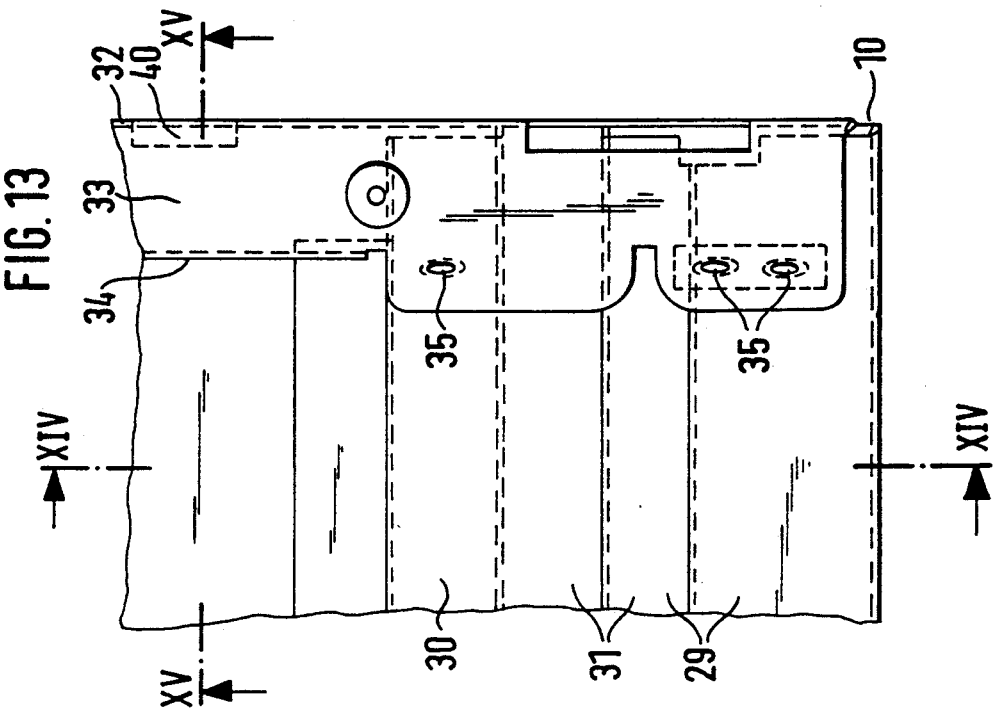
FIG. 13 is a view, on a larger scale, showing the corner portion of the shelf member seen in direction of arrow XIII of FIG. 12.
Figure 12:
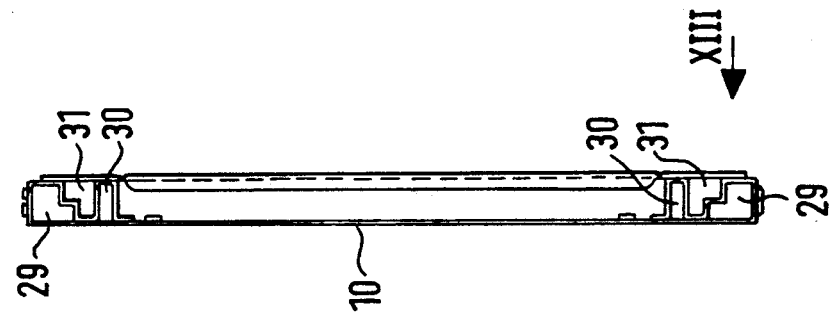
FIG. 12 is a sectional view of the shelf member of FIG. 11 seen in direction of arrow XII.
Figure 14:
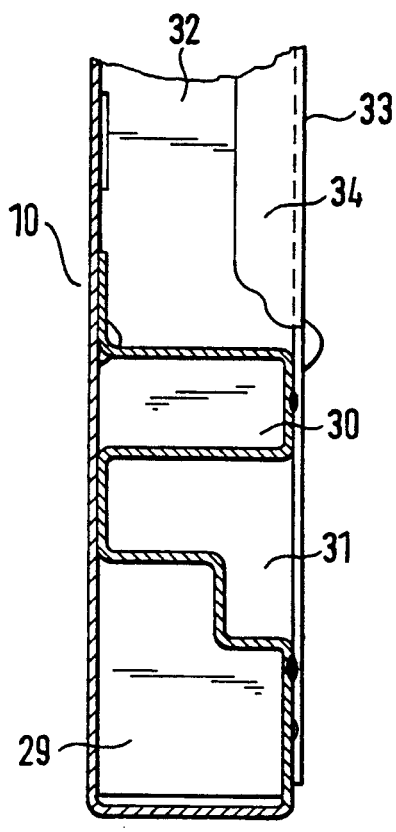
FIG. 14 is a sectional view taken along sectional line XIV—XIV in FIG. 13.
Figure 15:
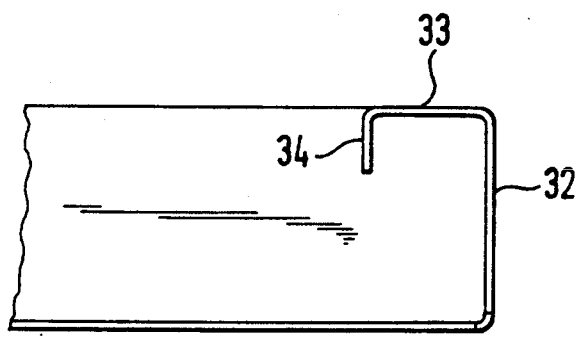
FIG. 15 is a sectional view taken along sectional line XV—XV in FIG. 13.

In order to stiffen the transverse edges, the shelf members 10 have bent portions 32, 33 and 34 which together result in an approximately J-shaped section, as shown in FIG. 15. However, this J-shaped section extends only over that longitudinal portion of the transverse edges which is located between the pipe-like sections 30 which extend parallel to the longitudinal edges, as can be seen in FIGS. 12 and 13 of the drawing. In the region of the pipe-like sections 29 and 30 and of the groove 31, the bent edges of the transverse edges are resting against the lower contact surface of the pipe-like section and are fastened, for example, by means of welding points 35, as illustrated in FIG. 13.

FIG. 16 of the drawing shows the arrangement of an inclined shelf member 10 relative to a longitudinal stop member 9 of the type illustrated in FIGS. 7 and 9. FIG. 16 also shows the arrangement of the stiffened longitudinal edges of the shelf member 10 composed of pipe-like sections 29 and 30 and the groove 31 relative to the longitudinal stop members 9.

Figure 8:
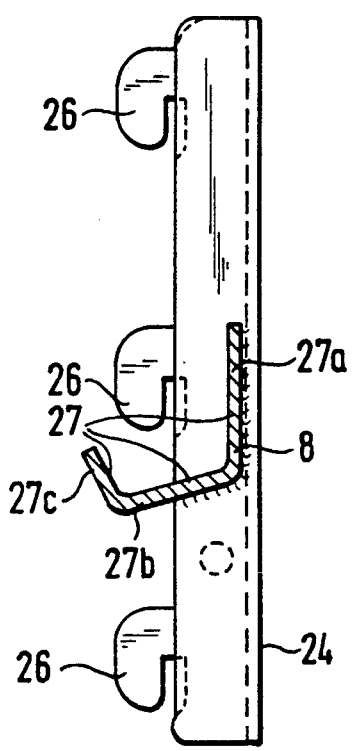
FIG. 8 is a sectional view taken along sectional line VIII—VIII of FIG. 6.

FIG. 17 of the drawing shows the arrangement of a horizontally aligned shelf member 10 relative to a longitudinal support member 8 whose sectional rail 27 has a configuration which differs from that of FIGS. 6 and 8. In this case, to the vertical section side 27a is connected a horizontal section web 27b which, in turn, is connected to a vertical section side 27c. As the drawing also shows, the sectional rail 27 which is approximately L-shaped in cross-section engages from below the pipe-like section 29 of the shelf member 10, wherein the section side 27c engages in the stepped groove 31 and, as a result, effects a secure mounting of the shelf members 10 so as to prevent displacement thereof.

Figure 11:
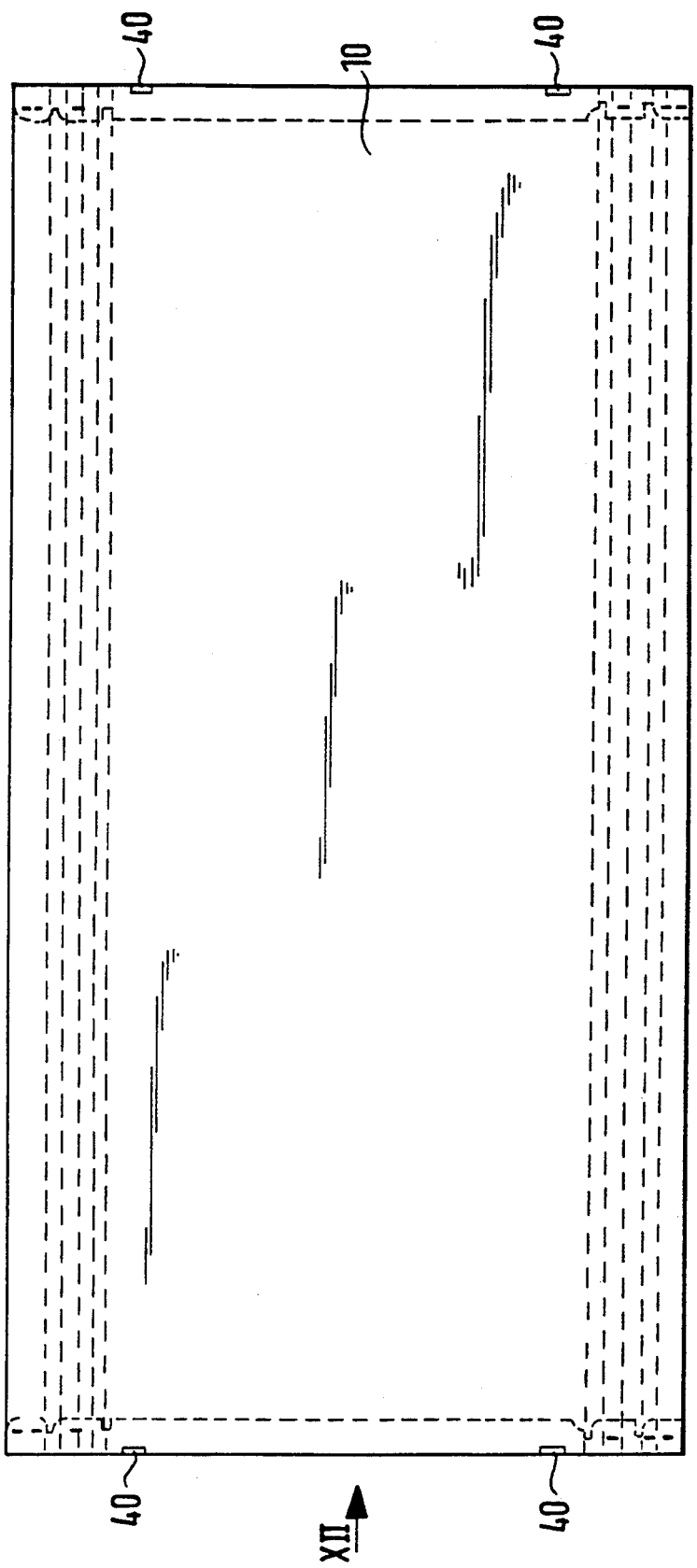
FIG. 11 is a schematically simplified top view of a shelf member of the shelf assembly of FIGS. 1 and 2.

As indicated in FIG. 1 of the drawing, it may be useful in some cases to provide the transverse edges of the shelf members with special wall members 36 which have a relatively low height and form a lateral border of the shelf member. These wall members 36 can also be seen in FIGS. 16 and 17 of the drawing. The wall member 36 is shown in particular detail in FIGS. 18 and 19 of the drawing. It can be seen that the upper longitudinal edge has a bent portion 37 for stiffening purposes. Cut in the lower longitudinal edge, several tongues 39 are formed by slot-like incisions 38 which are provided in pairs and extend transversely. The tongues 39 are bent inwardly in the manner of a spring. The clamping tongues 39 are inserted in longitudinal slots 40 which, as can be seen in FIGS. 11 and 13 of the drawing, are located immediately adjacent the bent portions 32 at the transverse edges of the shelf members 10. The wall member 36 rests with the plane portions 41 thereof which are located adjacent the tongues 39 in a supporting manner against the outer surface of the bent portions 32 with the result that the wall member 36 is aligned and projects upwardly above the respective shelf member, as can be seen in FIGS. 16 and 17.

Figure 21:
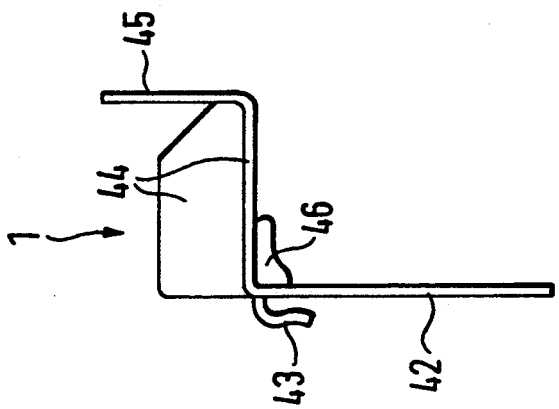
FIG. 21 is a view seen in direction of arrow XXI of FIG. 20.
Figure 20:
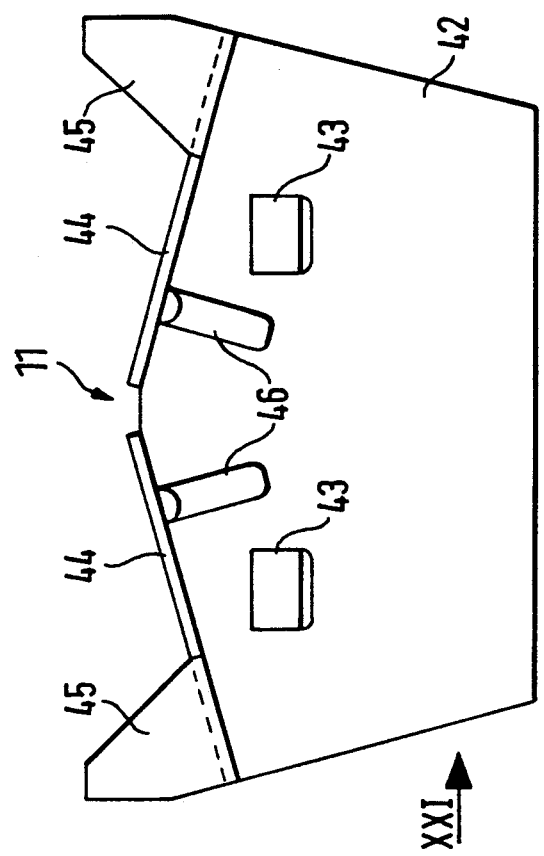
FIG. 20 is a view, on a larger scale, of detail XX of FIG. 2.

FIGS. 20 and 21 of the drawing show in detail the configuration of the shelf member carriers 11 which in FIG. 2 of the drawing are only schematically illustrated. As can be seen, the shelf member carrier 11 includes a plane coupling plate 42 which on the rear side thereof is provided with hook-like, downwardly directed locking tongues 43. Two outwardly bent support flanges 44 are provided at the top of the coupling plate 42. The support flanges 44 are inclined in a roof-like manner relative to each other. In addition, at least one upwardly directed fixing tooth or fixing tongue 45 is provided at the end edges of each support flange.

Stabilizing webs 46 extend between the coupling plate 42 and a support flange 44 for stiffening purposes.

Figure 22:
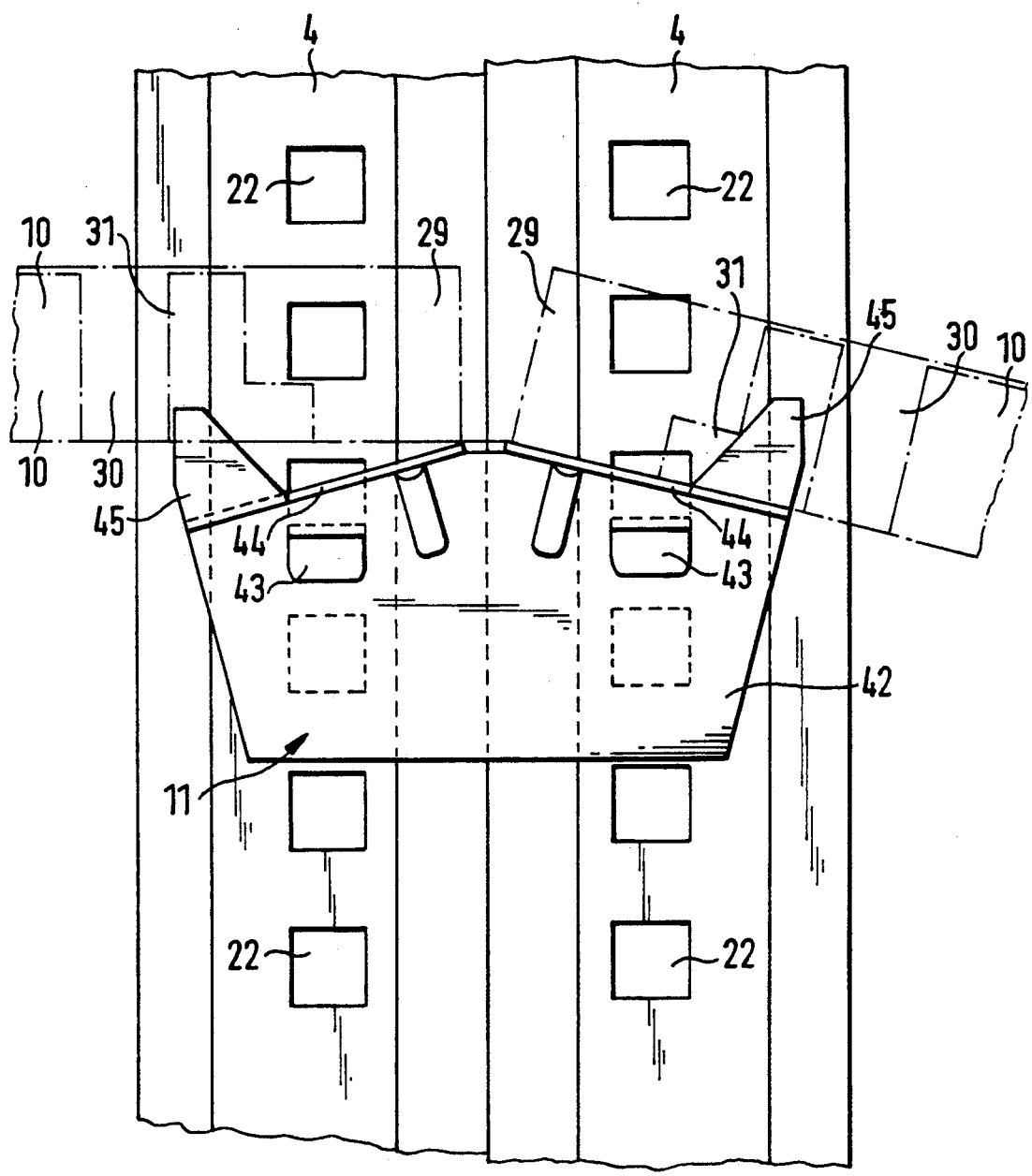
FIG. 22 is a view, on a larger scale, of detail XXII in FIG. 2.

FIG. 22 of the drawing shows how the shelf member carriers 11 are connected to the two posts 4 which are located immediately adjacent each other in longitudinal direction. For this purpose, the two locking tongues 43 of the coupling plate engage in the suspension detents 22 of the two posts 4 and, as a result, form a fixed connection through the coupling plate 42. When the shelf members 10 are placed on the shelf member carriers 11, the abutment of the pipe-like section 29 adjacent the longitudinal edge is formed by the support flanges 44, independently of whether the respective shelf member 10 is aligned horizontally or assumes an inclined position. Simultaneously, the fixing teeth or tongues 45 projecting upwardly from the support flanges 44 engage from below in the groove 31 between the two pipe-like sections 29 and 30 and, consequently, ensure a secure mounting of the shelf member 10 relative to the respective shelf member carrier 11.

The support of the shelf members 10 of both basic shelf elements 2 and 3 on the shelf member carriers 11 poses no difficulties when the shelf members are in the horizontal position in both basic shelf elements or if the shelf members are horizontal in one basic shelf element and are inclined in the other basic shelf element. However, there may be difficulties with respect to support if the shelf members of both basic shelf elements have the same inclined position. In this case, the shelf member 10 which is located vertically higher has in the region of its lower longitudinal edge a position on the shelf member carrier 11 in which it undercuts the upper longitudinal edge of the shelf member 10 which is lower than in the direction of inclination.

In order to prevent such an undercut position, FIG. 27 of the drawing shows the use of a lining adapter 47 which can be placed on the support flange 44 and which can be aligned by means of a fixing tongue 48 on the support flange 44. FIG. 28 of the drawing shows the shape of the lining adapter 47. On the other hand, FIG. 27 shows that the use of the lining adapter 47 has the result that the two inclined shelf members 10 extend in a common plane.

FIG. 1 additionally shows that the shelf assembly 1 or the basic shelf elements 2 and 3 can have bottom troughs 48. Each bottom trough 48 has a flat base plate 49 and side walls 50 which extend upwardly from the base plate 49 and whose upper ends have outwardly and downwardly directed, hook-shaped bent portions 51, as it can be seen particularly clearly in FIGS. 23 and 24. The bottom troughs 48 are advantageously provided if it is required to form a passage area underneath the lowermost shelf member for transport and storage boxes which are needed on the respectively opposite side of the shelf assembly.

In some cases it may also be useful to provide the lower ends of the posts 4 with base members 52, as they are indicated in FIG. 1 and shown in detail in FIGS. 25 and 26. These base members 52 may have upwardly angled flanges 53 which project into the hollow sections 12 of the posts 4 and which are provided with holes 54 which in the region of the suspension detents 22 facilitate the insertion of fastening elements.

The variable shelf assembly 1 described above can be realized in a simple manner in any chosen structural length on the basis of the concept of arranging basic shelf elements and added shelf elements. This makes possible any combination of storage shelf assemblies and so-called disposition shelf assemblies with horizontal and inclined shelf members. It is also possible to realize single-row storage shelves with horizontal shelf members as well as single-row disposition shelves with inclined shelf members. The shelf assembly has a high stability because of the stable frame construction with the diagonal struts and the transverse support members which act in pushing direction of the storage and transport boxes and because of the longitudinal stability resulting from the longitudinal support members integrated in the support members. The shelf can be assembled without requiring many tools. Rather, the assembly can be done manually, for example, merely with the use of a hammer. This is because no screw connections are required and the connections of basic shelf elements and added shelf elements arranged one behind the other is effected solely by the shelf member carrier.

Another useful and advantageous feature is the fact that all shelf members can be vertically adjusted as desired in accordance with the spacings of the suspension detents provided in the posts.

While specific embodiments of the invention have been shown and described in detail to illustrate the inventive principles, it will be understood that the invention may be embodied otherwise without departing from such principles.

I claim:
1. A variable shelf assembly comprising at least two basic shelf elements, each basic shelf element including:
   two side frames;
   a plurality of shelf members mounted between said two side frames; and a plurality of support members for horizontal alignment of the shelf members; said support members extending transverse to said side frames;
wherein each of said side frames comprises:
two posts;
two transverse members for connecting said two posts to each other, and
a diagonal strut extending between said two posts;
wherein, at least at a withdrawal side of said basic shelf element, each shelf is provided with at least one of the support members which forms a support and abutment element for the shelf;
wherein said two basic shelf elements are arranged one behind the other, the shelf assembly further comprising shelf member carriers for coupling the basic shelf elements to each other, the shelf member carriers engaging immediately adjacent posts of the side frames of the basic shelf of elements; and
wherein all shelf members of said two basic shelf elements are aligned horizontally, wherein always two shelf members are located one behind the other in the same plane, and wherein longitudinal edges of two adjacent shelf members which face each other exclusively rest with end portions thereof on the shelf member carriers.

2. A variable shelf assembly comprising at least tow basic shelf elements, each basic shelf element including:
two side frames;
a plurality of shelf members mounted between said two side frames; and
a plurality of support members for horizontal alignment of the shelf members and stop members for inclined alignment of the shelf members, both members extending transverse to said side frames;
wherein each of said side frames comprises:
two posts;
two transverse members for connecting said two posts to each other, and
a diagonal strut extending between said two posts;
wherein, at least at a withdrawal side of said basic shelf element, each shelf is provided with one of the support members and the stop members which forms a support and abutment element for the shelf;
wherein said two basic shelf elements are arranged one behind the other, the shelf assembly further comprising shelf member carriers for coupling the basic shelf elements to each other, the shelf member carriers engaging immediately adjacent posts of the side frames of the basic shelf elements; and
wherein all shelf members of one of the two basic shelf elements are aligned horizontally, while all shelf members of the other of the basic shelf elements are in an inclined position, wherein a longitudinal edge of each inclined shelf member is located in the same plane as a longitudinal edge of the adjacent horizontally aligned shelf member, and wherein the longitudinal edges of two adjacent shelf members which face each other rest exclusively with end portions thereof on the shelf member carriers.

3. A variable shelf assembly comprising at least two basic shelf elements, each basic shelf element including:
two side frames;
a plurality of shelf members mounted between said two side frames; and
a plurality of support members for horizontal alignment of the shelf members and stop members for inclined alignment of the shelf members, both members extending transverse to said side frames;
wherein each of said side frames comprises:
two posts;
two transverse members for connecting said two posts to each other, and
a diagonal strut extending between said two posts;
wherein, at least at a withdrawal side of said basic shelf element, each shelf is provided with one of the support members and the stop members which forms a support and abutment element for the shelf;
wherein said two basic shelf elements are arranged one behind the other, the shelf assembly further comprising shelf member carriers for coupling the basic shelf elements to each other, the shelf member carriers engaging immediately adjacent posts of the side frames of the basic shelf elements; and
wherein all shelf members of said two basic shelf elements are mounted in an inclined position, wherein always two shelf members are located on the same inclined plane and longitudinal edges of the two adjacent shelf members rest exclusively with end portions thereof on the shelf member carriers, and wherein each shelf member carrier includes a lining adapter which comes into contact with the lower longitudinal edge of the shelf member which is mounted at a higher position.

4. The shelf assembly according to claim 3, comprising fixing tongues on support flanges of the shelf member carriers for anchoring and aligning the lining adapters.

5. A variable shelf assembly comprising at least two basic shelf elements, each basic shelf element including:
two side frames;
a plurality of shelf members mounted between said two side frames; and
a plurality of support members for horizontal alignment of the shelf members and stop members for inclined alignment of the shelf members, both members extending transverse to said side frames;
wherein each of said side frames comprises:
two posts;
two transverse members for connecting said two posts to each other, and
a diagonal strut extending between said two posts; and
wherein, at least at a withdrawal side of said basic shelf element, each shelf is provided with one of the support members and the stop members which forms a support and abutment element for the shelf; and
wherein the shelf members have at an underside and at longitudinal and transverse edges thereof, stiffening profiles formed by bevels, the stiffening profiles being composed of several profile portions which are closed in the manner of a pipe and extend parallel to each other and at a distance from each other, the space-apart portions having a stepped configuration, wherein a stepped portion thereof forms a support engagement for the longitudinal support members or longitudinal stop members and for fixing teeth or fixing tongues provided on the shelf member carriers.

6. A variable shelf assembly comprising at least two basic shelf elements, each basic shelf element including:
two side frames;
a plurality of shelf members mounted between said two side frames; and a plurality of support members for horizontal alignment of the shelf members and stop members for inclined alignment of the shelf members, both members extending transverse to said side frames;

wherein each of said side frames comprises:
two posts;
two transverse members for connecting said two posts to each other, and
a diagonal strut extending between said two posts; and wherein, at least at a withdrawal side of said basic shelf element, each shelf is provided with one of the support members and the stop members which forms a support and abutment element for the shelf;

wherein the posts of the side frames are hollow sections having an approximately W-shaped cross-section with two outer sides and two inner sides, the two outer sides of the W-shaped section and an apex portion between the two inner sides of the W-shaped section each having at least one row of suspension detents arranged uniformly distributed in longitudinal direction, the transverse support members having ends extending into an open side of the W-shaped section and being anchored on the outer sides of the W-shaped section, the suspension detents forming in the apex portion of the inner sides of the W-shaped section of each post coupling means for coupling shoes provided at ends of the longitudinal support member or longitudinal stop members, the coupling shoes extending around and being adapted to an outerside of the W-shaped section and an inner side of the W-shaped section and being engaged by means of coupling hooks in the coupling means, wherein the suspension detents are provided at the outer sides of the W-shaped section of the post as coupling means for locking tongues of shelf member carriers for coupling the basic shelf elements to each other, and wherein the shelf member carriers have at a coupling plate supporting the locking tongues, two support flanges for the shelf members, wherein the support flanges are angled and inclined in a roof-like manner relative to each other, wherein fixing teeth or fixing tongues extend upwardly from end edges of the support flanges, and wherein stabilizing webs extend between the coupling plate and the support flanges.

7. A variable shelf assembly comprising at least two basic shelf elements, each basic shelf element including:
two side frames;
a plurality of shelf members mounted between said two side frames; and
a plurality of support members for horizontal alignment of the shelf members and stop members for inclined alignment of the shelf members, both members extending transverse to said side frames;
wherein each of said side frames comprises:
two posts;
two transverse members for connecting said two posts to each other, and
a diagonal strut extending between said two posts;
wherein the two basic shelf elements are arranged immediately one behind the other, the shelf assembly further comprising shelf member carriers for coupling the two basic shelf elements which, on one hand, engage immediately adjacent posts of respective side frames of the two basic shelf elements and, on the other hand, support ends of adjacent longitudinal edges of the shelf members of the two basic shelf elements.

8. The shelf assembly according to claim 7, wherein the posts of the side frames are hollow sections having an approximately W-shaped cross-section with two outer sides and two inner sides, the two outer sides of the W-shaped section and an apex portion between the two inner sides of the W-shaped section each having at least one row of suspension detents arranged uniformly distributed in longitudinal direction, the transverse support members having ends extending into an open side of the W-shaped section and being anchored on the outer sides of the W-shaped section, the suspension detents forming in the apex portion of the inner sides of the w-shaped section of each post coupling means for coupling shoes provided at ends of the longitudinal support members or longitudinal stop members, the coupling shoes extending around and being adapted to an outer side of the W-shaped section and an inner side of the W-shaped section and being engaged by means of coupling hooks in the coupling means, wherein the suspension detents are provided at the outer sides of the W-shaped section of the post as coupling means for locking tongues of the shelf member carriers.

9. The shelf assembly according to claim 8, wherein the two outer sides of the W-shaped section have free ends, the free ends being provided with an inwardly bent angle portion, wherein end flanges of both angle portions are located on a plane which extends approximately in the middle between an outer and an inner side of the W-shaped section, a space defined between an outer side and an inner side of the W-shaped section and a space defined between the two inner side of the W-shaped section being approximately trapezoidally-shaped, wherein the end flanges of both angle portions are provided with fastening means for the transverse support members and for the diagonal struts.

10. The shelf assembly according to claim 9, wherein coupling hooks of two longitudinal support members or longitudinal stop members which are directed toward opposite sides are engageable in the suspension detents in the apex portion of the inner sides of the W-shaped section of each post, and wherein another group of longitudinal support members or longitudinal stop members form together with another frame an added basic shelf element.

11. The shelf assembly according to claim 7, wherein the longitudinal support members or longitudinal stop members are sectional rails which are mounted rigidly between two coupling shoes arranged and constructed in a mirror-inverted manner, the sectional rails having an approximately L-shaped cross-section.

12. The shelf assembly according to claim 7, wherein the longitudinal support members or longitudinal stop members are sectional rails which are mounted rigidly between two coupling shoes arranged and constructed in a mirror-inverted manner, the sectional rails having an approximately upside down J-shaped cross-section.

13. The shelf assembly according to claim 7, comprising wall members releasably coupled to transverse edges of the shelf members.

14. The shelf assembly according to claim 13, wherein the wall members rest over a lower portion of the height thereof against outer sides of stiffening profiles of the transverse edges of the shelf member and wherein the wall members engage with tongues bent out of the plane thereof from the top into slots which are provided near edges of the upper side of the shelf members.

15. The shelf assembly according to claim 7, wherein at least the longitudinal support members and longitudinal stop members on the removal side of the shelf assembly are composed of sectional rails which have a structural height which exceeds the structural height of the shelf members.

* * * * *